UNITED STATES PATENT OFFICE.

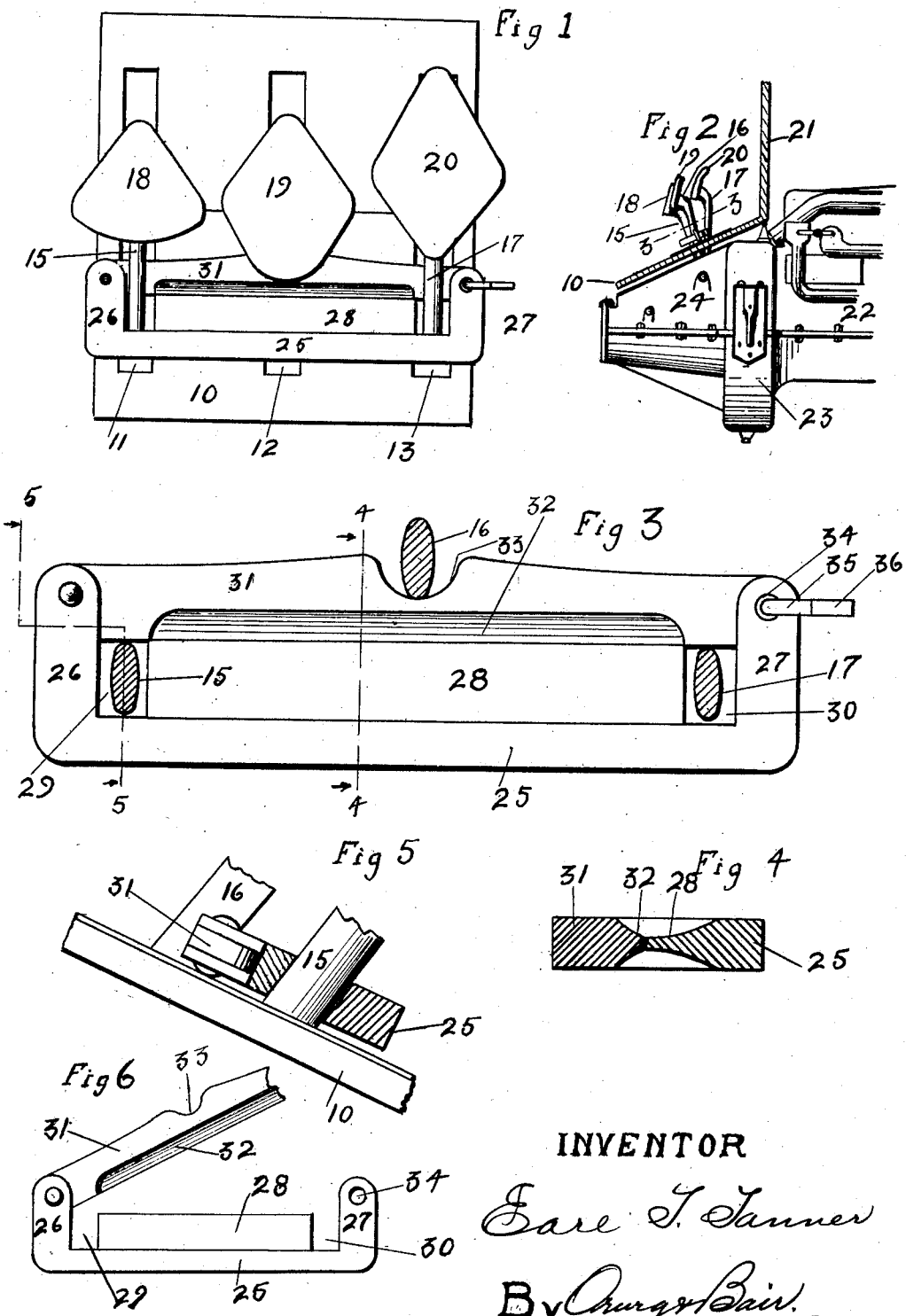

EARL T. TANNER, OF DES MOINES, IOWA.

AUTOMOBILE-LOCK.

1,393,182.  Specification of Letters Patent.  Patented Oct. 11, 1921.

Application filed November 20, 1919. Serial No. 339,477.

*To all whom it may concern:*

Be it known that I, EARL T. TANNER, a citizen of the United States, and a resident of Des Moines, in the county of Polk and State of Iowa, have invented a certain new and useful Automobile-Lock, of which the following is a specification.

The object of my invention is to provide an automobile lock device of simple, durable and inexpensive construction for foot controlled levers for the type used in driving Ford automobiles, whereby the levers can be locked in such position, as to hold both the high speed and low speed gears in mesh, so that the car cannot be moved in any direction.

With these and other objects in view, my invention consists in the construction, arrangement and combination of the various parts of the device, whereby the objects contemplated are attained, as hereinafter more fully set forth, pointed out in my claim and illustrated in the accompanying drawings, in which:

Figure 1 shows a top or plan view of a portion of the floor board of the car, showing the levers with my improved lock device thereon.

Fig. 2 shows a side elevation of the same floor board and dash, being shown in vertical cross section.

Fig. 3 shows a sectional view taken on the line 3—3 of Fig. 2.

Fig. 4 shows a sectional view taken on the line 4—4 of Fig. 3.

Fig. 5 shows a detailed, sectional view taken on the line 5—5 of Fig. 3; and

Fig. 6 shows a plan view of my lock device.

In the drawings herewith, which illustrate my invention, I have used the reference numeral 10 to indicate generally the floor board of the car in which are the openings 11, 12 and 13 for the high and low speed lever 15, the reverse lever 16 and the brake lever 17.

On these levers are the ordinary foot engaging pedals 18, 19 and 20. In front of the levers is the ordinary dash 21.

In Fig. 2 I have shown the portion of the engine thereto, in the rear of which, is the fly wheel 23, and gear casing 24.

My improved lock device comprises a bar 25, having at its ends forward projecting arms 26 and 27. On the bar 25 is the forwardly extending flange 28 terminating at its ends short of the arms 26 and 27, so as to leave spaces 29 and 30 to receive the levers 15 and 17. Pivoted or hinged to the forward end of the arm 26 is a locking bar 31, having on its side for the greater portion of its length, a flange 32 of less thickness than the main portion of the said locking bar.

In the forward central portion of the locking bar 31 is a lock 33 for receiving the lever 16. The free end of the locking bar 31 and the forward end of the arm 27 have holes 34, which when the locking device is closed, register with each other to receive the shackle 35 of a padlock 36.

Any suitable means for locking the bar 31 to the arm 27 may be employed.

The locking device is so constructed and shaped and the parts thereof are of such size that the bar 31 may be slipped into position with the lever 16 received in the notch 33 and with the levers 15 and 17 engaged by the rear surface of the bar 31 at the end thereof, and the bar 25 may then be swung around to position where the holes 34 in the arm 27 and bar 31 register, whereupon the flanges 28 and 32 will abut against each other, and the lever 15 will be held in position for holding the high speed gears in mesh, while the lever 16 will be held in position for holding the reverse speed gears in mesh. While locking the locking device around the brake lever 16, such locking device is held from any movement which might release the gears from their mesh.

When the padlock has been installed in position, the car will be absolutely locked against movement, and can not be towed away.

One advantage in the construction herein shown resides from the arrangement of the flanges 32 and 28, which are of less thickness than the bars 31 and 25, so that it would be difficult to get a screw-driver or other similar instrument between the flanges for prying the bar 31 and 25 apart. The locking device may be quickly installed on the car and removed therefrom.

Some changes may be made in the construction and arrangement of my locking device without departing from the real spirit and purpose of my invention, and it is my intention to cover by my claim any modified forms of structure of use of mechanical equivalents, which may be reasonably included within their scope.

I claim as my invention:

A locking device for a plurality of pedal controls comprising a rear bar, an arm extending forwardly from said bar at each end thereof, a flange on said bar extending forwardly and terminating short of said bar for leaving a space between said arms and said flange for receiving a pedal control lever in each space, a locking bar pivoted to one of said arms, and adapted to rest against the other of said arms, means for locking together the free end of said locking bar and the free arm, said locking bar being provided with a notch intermediate of its ends whereby a pedal control may be received therein, the parts being so arranged that slight movement of the levers may be had in order to accommodate any inaccuracy in spacing of lever control pedals.

Des Moines, Iowa, October 6, 1919.

EARL T. TANNER.